H. LEVIN.
PROCESS OF MAKING CLUSTER MOUNTINGS AND BLANK USED IN SUCH PROCESS.
APPLICATION FILED AUG. 28, 1909.

983,504.

Patented Feb. 7, 1911.

WITNESSES:
James P. Duhamel
Geo. A. Senior

INVENTOR,
Harris Levin,
BY Cackwell,
ATTORNEY

UNITED STATES PATENT OFFICE.

HARRIS LEVIN, OF NEW YORK, N. Y.

PROCESS OF MAKING CLUSTER-MOUNTINGS AND BLANK USED IN SUCH PROCESS.

983,504. Specification of Letters Patent. Patented Feb. 7, 1911.

Application filed August 28, 1909. Serial No. 515,008.

*To all whom it may concern:*

Be it known that I, HARRIS LEVIN, a citizen of the United States, and resident of New York, in the county of New York and State of New York, have invented a certain new and useful Process of Making Cluster-Mountings and Blanks Used in Such Processes, of which the following is a specification.

This invention relates to a process of making cluster mountings or heads for gems which mountings are of the highest grade now used. By this process superior articles are produced from single pieces of metal with little or no handwork as will now be explained. The invention also includes blanks to be used in such processes.

Figure 1:
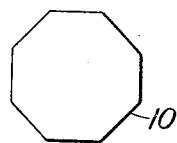
Figure 4:
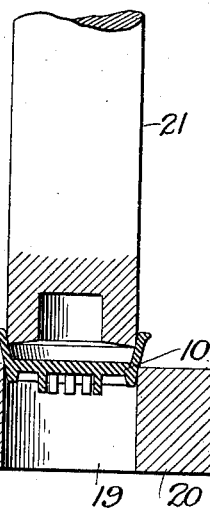
Figure 7:
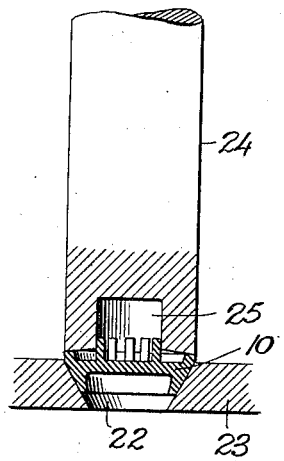
Figure 2:
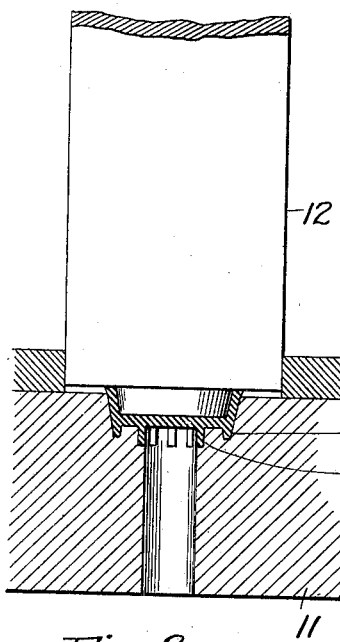
Figure 5:
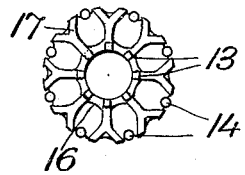
Figure 8:
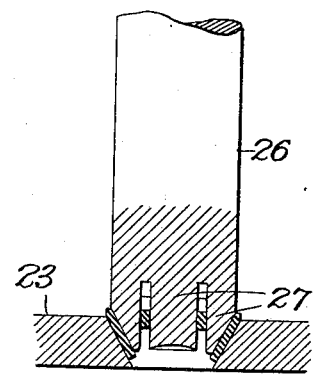
Figure 3:
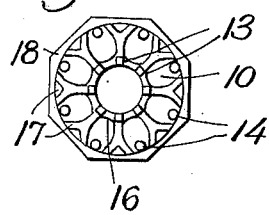
Figure 6:
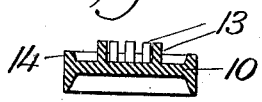
Figure 9:
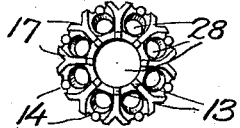

Figure 1 is a plan view of a blank from which a cluster head is made. Fig. 2 is a sectional view of a die showing how the blank is first swaged or formed. Fig. 3 is a plan view of a cluster head after passing through the die. Fig. 4 is a sectional view of a die used for trimming the edges of the head. Fig. 5 is a view of the head with the edges trimmed. Fig. 6 is a sectional view of the same. Fig. 7 shows a die for beveling the head. Fig. 8 shows a die for perforating the head and giving it its final form. Fig. 9 is a plan view of the completed head.

In the manufacture of heads or cluster settings, the operation has been a complicated and costly one, it having been the practice to form the claws which engage the gems separately and solder them together afterward, especially the center claws, but this has been a delicate and tedious operation resulting in placing the claws irregularly and as the soldering sometimes is weak, the claws are often broken off and the gems lost. In order to overcome these difficulties, the present invention is designed to form the cluster head of one piece of metal and have the claws integral with the main body of the head so that they may be bent over upon the edges of the gem to hold it in place. The head is swaged or formed from a blank 10 of suitable metal such as platinum, gold or silver, and for that purpose it is placed in a die 11 where by the punch or plunger 12 it is forced into the cavities of the lower die so as to assume the shape shown in Figs. 2 and 3. The center claws 13 are formed by this operation and portions of the outside claws 14 and the fish tails 17 are also shaped thereby. In this first operation is formed a beveled side 18 with a rough edge which it will be necessary to remove in the next operation. The head is then placed over the perforation 19 in a plate 20 and subjected to the pressure of the punch 21 of the same size as the perforation and this operation trims the edges as shown in Figs. 5 and 6, the beveled side being removed and cut to vertical lines.

The next operation is shown in Fig. 7 where the head is placed upward in the bevel edged opening 22 of a plate 23 and subjected to the pressure of a plunger 24 having a centering cavity 25 to fit around the center claws and properly position the head in the perforation 22 where, upon pressure the sides are drawn inward on the under face so as to bevel the same for the completed head. The last operation, illustrated in Fig. 8, is performed by a punch 26 having various pins 27 which cut into the head as shown in this view and force out the cavities 28 and cut out the scallops around the edge of the head, but it is obvious that these cavities may be punched separately and the finishing done by hand.

As will be seen in Fig. 9 the head is delicately and perfectly formed and is given the proper finish for immediate use. The swaging strengthens the metal and renders it more compact so that the claws are much more reliable than the old style of soldered claws on account of the strength of the continuous piece of metal from which they are formed. It is evident that in addition to the strength of this head that the economy in manufacture of the same is a very desirable feature and immense saving of metal is effected. It is obvious that these heads may be made for any number of gems or of any desired design; also that the original blank used therefor may be made round if desired. On account of the mode of manufacture the cluster heads produced in the manner shown are absolutely uniform in size and shape which is another valuable feature.

What I claim as new is:

1. A blank for making a cluster mounting, which consists of a piece of metal provided with claws extending outwardly from its top and a flange diverging from its bottom.

2. A blank for making a cluster mounting, which consists of a piece of metal plate provided with claws and a perpendicular flange at its edge.

3. A blank for making a cluster mounting which consists of a piece of metal provided at its top with inner and outer claws and having a flange converging from its bottom.

4. In the art of making cluster mountings, the improvement which consists in swaging a piece of metal so as to produce a flange diverging from one side in one operation and then in another operation changing the flange so as to become perpendicular to said piece of metal.

5. In the art of making cluster mountings, the improvement which consists in swaging a piece of metal so as to produce a flange diverging from one of its sides in one operation, in another operation changing the flange so as to become perpendicular to said piece of metal and in a third operation changing the flange so as to diverge from the other side of said piece of metal.

6. In the art of making cluster mountings, the improvement which consists in swaging a piece of metal so as to produce claws extending outwardly from its top and a flange diverging from its bottom in one operation and then in another operation changing the flange so as to become perpendicular.

7. In the art of making cluster mountings, the improvement which consists in swaging a piece of metal so as to produce claws extending outwardly from its top and a flange diverging from its bottom in one operation, then in another operation changing the flange so as to become perpendicular and in a third operation changing the flange so as to converge from its bottom.

Signed at New York in the county of New York and State of New York this 27th day of August A. D. 1909.

HARRIS LEVIN.

Witnesses:
C. A. O. ROSELL,
LOUIS LEVIN.